March 4, 1930.   O. U. ZERK   1,749,727
LUBRICANT GUN
Filed Nov. 27, 1929
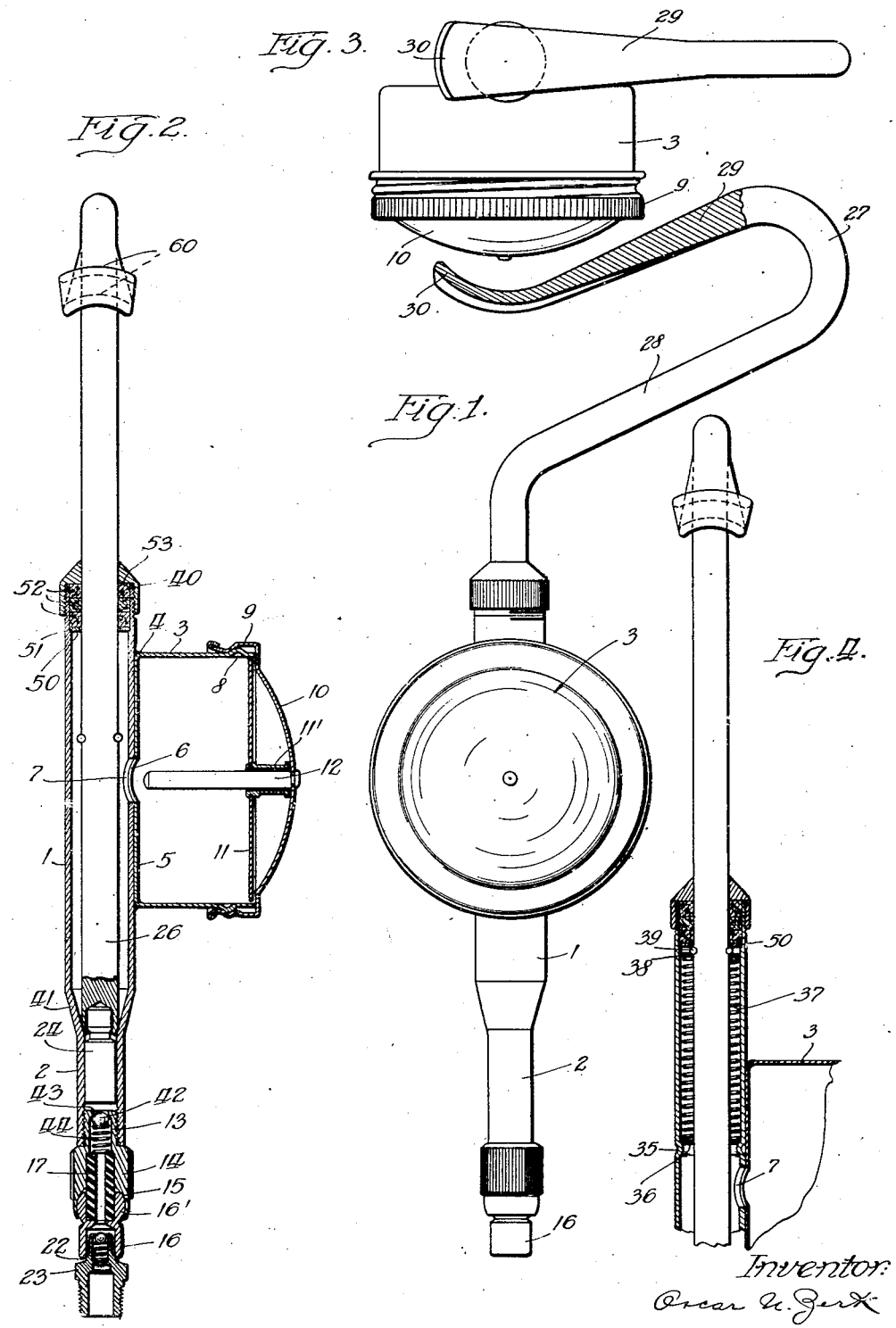
Inventor:
Oscar U. Zerk Patented Mar. 4, 1930

1,749,727

UNITED STATES PATENT OFFICE

OSCAR U. ZERK, OF CHICAGO, ILLINOIS

LUBRICANT GUN

Application filed November 27, 1929. Serial No. 410,216.

My present invention relates to lubricating guns and more especially to that class of lubricating guns commonly known in the trade as grease guns and oil guns, which are employed for the purpose of quickly and easily supplying a quantity of lubricant to bearing nipples of an automobile chassis or other mechanism requiring periodic lubrication.

The apparatus of my present invention is equally well adapted for use in connection with the lubrication of vehicles, such as the chassis bearings of automobiles, tractors, gun carriages, war tanks, locomotives, airplanes, air ships, sea vessels, etc., or in connection with industrial lubrication, which includes the lubrication of stationary machines, such as stamping presses, printing presses, engines, textile machinery, shafting, and all the other numerous types of machines and machine tools of modern industry.

In grease gun lubrication two types of apparatus are commonly used: First, the interlocking type employing a coupling for the purpose of temporarily rigidly interlocking the lubricating gun nozzle and the lubricant receiving nipple, and second, the contact type where the lubricating gun nozzle and nipple are not temporarily rigidly interlocked, but simply pressed against each other and held in lubricant communicating contact by manual pressure during the lubricating period.

My present invention applies both to the interlock and to the contact types of guns, although, it is believed to have a more particular application to guns of the contact type.

In the embodiment of my invention, I preferably provide the gun with a nipple engaging nozzle of such form that the lubricant barrel can be oscillated from alignment with the axis of the nipple so that it may be positioned where its operation will not be interfered with by any parts of the mechanism adjacent to the nipple. I, therefore, contemplate using the gun of my present invention in connection with a nozzle and nipple construction, one preferred form of which is shown and described in my co-pending application, Serial No. 396,352, filed September 30, 1929 (Case 11).

However, particularly in its broader aspects, the gun of my present invention may be employed with other nozzle and nipple constructions, as will be apparent to those skilled in the art to which my invention appertains.

In my present invention, I prefer to employ a shallow lubricant container laterally connected to a relatively long tubular gun barrel of relatively small diameter, the barrel acting primarily merely as a lubricant conduit in which the piston rod may reciprocate.

A grease gun of this general type is shown and described in my pending applications, Serial No. 396,354 filed September 13, 1929 (Case 14) and Serial No. 399,961, filed September 16, 1929 (Case 15). In both of these applications, the lubricant container and the gun barrel to which it is laterally connected constitute as a whole a T-shaped conduit, that is to say there are two conduits or communications leading from the internal outlet of the lubricant container, one communication leading to the nozzle, that is to the lower end of the long tubular conduit, and the other communication leading to the other end of this tubular conduit. Thus, the lubricant coming from the lateral lubricant container moves toward the lubricant dispensing nozzle along a generally L-shaped path.

In the older types of grease guns wherein the lubricant container is coaxial with the lubricant dispensing nozzle, the lubricant moves from the container to the nozzle along a substantially rectilinear path, that is in one direction only. In these older types of guns, therefore, there being only one outlet from the lubricant container, it is impossible for air to be sucked into the nozzle particularly when a lubricant follower is employed in the container, except when the lubricant container is empty.

In the T-shaped conduit construction referred to, however, comprising the double ended barrel and the lateral container, when suction is applied at the nozzle end of the barrel, and the other end of the barrel communicates with atmospheric pressure at relatively low resistance and the lubricant container between the ends offers a relatively large resistance due to the relatively high surface tension of the lubricant and to its own cohesion and viscosity, air entering from the end of the barrel opposite the nozzle may be sucked into the piston cylinder more readily than lubricant from the lubricant container.

In order that all of the advantages of the general type of grease gun shown and described in my above mentioned pending applications may be realized, I find in some cases that it is desirable to make provision to effectively prevent leakage of air into the end of the gun barrel opposite the nozzle.

Again, in grease guns of the cheapest and simplest possible type, such as for example that shown and described in my pending application (Case 14) above referred to, wherein the handle of pistol grip shape is formed integrally from the piston rod by bending it into suitable form, I find that in order that the operator may press the gun against the lubricant receiving nipple with the necessary pressure, the grip may advantageously be formed with two characteristics in view, namely, such shape as to prevent the hand from slipping over the upper portion of the pistol grip when pressure is applied; and, an area of contact with the hand great enough to prevent discomfort or pain to the operator.

It so happens that the portion of the hand between the thumb and forefinger against which most of the reaction of the gun handle occurs when the gun is pressed upon the lubricant receiving nipple is not only one of the softest, but one of the most sensitive parts of the hand. In cases, such as above mentioned, wherein the handle is formed from a bent wire, I find that the operation of the gun as a whole may be rendered more effective and efficient by designing the handle with these facts in view.

It is, therefore, one of the objects of my invention to provide in a grease gun of the type adapted to be applied with pressure against a lubricant receiving nipple, a piston rod and handle formed integrally from a round rod or wire, the handle portion of which is flattened out, and curved longitudinally and transversely and so shaped as to make contact with the operator's hand upon a maximum of contact area when the operator applies pressure to the handle for the purpose stated.

Another object of my invention is to provide in a lubricant gun of the type having a cylindrical barrel provided with a lubricant nozzle at one end, a piston rod reciprocable in the other end and a lubricant container communicating laterally with the barrel intermediate its ends, means for sealing the piston rod in the end of the barrel against the admission of air to the barrel.

Another object is to provide an air sealing means for the purpose referred to which is adapted to effect a seal between the outer cylindrical surface of the piston rod and the inner cylindrical surface of the barrel.

Other objects of my invention and the invention itself will be better understood by reference to the following description of a certain embodiment of my invention illustrated in the accompanying drawings referred to in said description.

In the drawings:—

Fig. 1 is a side elevational view of a lubricant gun in which my invention is embodied;

Fig. 2 is a side, longitudinal sectional view of the gun of Fig. 2;

Fig. 3 is a plan view of the gun of Fig. 1 taken from above;

Fig. 4 is a fragmentary view similar to Fig. 2 showing a modification.

Referring now to the different figures of the drawing in all of which like parts are designated by like reference characters, at 1 I show an elongated slender tube having a reduced end 2 forming a piston cylinder. At 3 is shown a lubricant reservoir in the form of a shallow cup having an end wall 5 which is rigidly affixed to a lateral wall of the relatively enlarged portion of the tube 1 by soldering the exterior surface of the tube 1 within a transversely grooved portion 4 of the end wall 5, the contiguous surface of the tube and cup end wall being closely sealed together, so that lubricant passing through aligned openings 6 and 7 of the cup end wall and the lateral wall of the tube to communicate lubricant from the reservoir to the interior of the tube cannot flow between the contiguous interengaging surface.

The cup is provided with an outwardly extending helical bead 8 near its rim over which a cooperatively threaded annular flange 9 of a cover cap 10 may be threaded to provide the reservoir cup 3 with a substantially leak proof covering.

A grease follower 11 is mounted within the cup, the follower being in the form of a disk, to the center of which is secured a tubular guide 11' axially slidable upon a rod 12 axially disposed within the cup and secured at one end to the cap 10, whereby the follower 11 may follow the lubricant as it discharges from the cup and be maintained in a transverse right angular position in the cup at all points of its movement.

The piston cylinder portion 2 of the tube 1 terminates in an internally threaded end adapted to receive the externally threaded stem 13 of a nose 14 terminating downwardly in a spherical recess 15 within which a spherical knob 16' of the gun nozzle 16 is mounted by a universal joint form of connection, and the nose 14 and knob 16 are bored out coaxially to receive therein a connecting conduit element 17 formed of flexible material such as rubber or leather. The threaded stem of the nose is provided on its inner end with a valve seat 43 sealably engaged by a valve ball 42 resiliently held in sealing engagement therewith by a spring 44 abutting at one end upon the ball and at the other upon one end of the conduit element 17.

The extreme tubular end 22 of the nozzle provides an open mouth adapted to be telescoped over a nipple such as that shown at 23 to make leak proof engagement with a contact surface of the nipple, as more fully described in my said co-pending application.

A piston 24 of cork or other suitable material is secured in any suitable manner upon the end of a piston rod 26 made of heavy wire and which projects into the tube 1 from its upper or rear end and which is bent into the form of a handle grip, more fully to be described later, and at the end disposed exteriorly of the tube.

Onto the enlarged end of the tube 1 is screw threaded a cap 40 provided with a perforation coaxial with the tube. The rod 26 engaging the inner edges of the perforation is centered thereby and the converging walls 41 of the tube serve to guide the piston 24 to axial position relative to the piston cylinder portion 2 which it enters upon each forward stroke of the piston rod 26 caused by manually directed pressure effected on the hand grip provided upon the rod 26, to be described, at the external end of the rod 26.

The rod 26 is sealed adjacent the cap 40 by the following parts. A metal washer 50 resting upon a shoulder 51 in the tube 1 formed by a slightly enlarged bore in the end thereof supports a plurality of packing washers 52, 52. Upon screwing the cap 40 inwardly on the tube, the upper end wall 53 thereof will compress the packing washers 52 between the wall 53 and the washer 50 causing them to expand laterally and effect sealing engagement both with the cylindrical wall of the rod 26 and the inner cylindrical bore of the tube 1 with an air tight seal.

The gun of my invention is provided with a handle or handle grip formed integrally with the rod 26 by forming and bending the same exteriorly of the tube 1. It comprises an upwardly sloping laterally directed branch 28 continuing in a loop 27 and in a reversely directed arm 29 generally parallel to the arm 28. The arms 28 and 29 are spaced apart suitably to be gripped by the operator's hand in the manner of a pistol grip. The free end of the arm 29 is at its extreme end bent slightly upwardly as at 30, to prevent the operator's hand from sliding downwardly on the arm 29 when pressure is applied by the palm of his hand thereon.

As will be described in the operation of my invention, the operator must apply considerable pressure on the arm 29 of the handle grip and in order that the grip may be formed from the relatively small diameter rod 26 and yet permit the operator to apply said pressure efficiently and without discomfort, the area of contact between his hand and the arm 29 of the handle is increased to the maximum possible without unduly weakening the handle, by forming it as follows:

The arm 29 in the direction toward its free end and beginning at the termination of the loop 27 thereof is mashed or otherwise formed of gradually reduced thickness, thus gradually increasing its width, and transversely the arm 29 is also curved convexly upwardly over the length of the arm 29 as shown at 60—60 in Fig. 2 and indicated in the cross-sectional portion of the handle in Fig. 1.

It will be observed that the bending stresses in the arm 29 decrease toward the free end. Since this is accompanied by the diminishing thickness of the arm, the handle is not weakened.

In the modification of my invention shown in Fig. 4, the tube 1 is provided with an annular bead 35 projecting inwardly to form a shoulder within the bore of the tube, upon which a washer 36 is seated to support one end of a helical spring 37 whose other end engages a like washer 38 making abutting engagement with laterally extending ears 39 formed integrally with the rod 26 by a pinching broaching portion, the interposed spring exerting pressure on the rod 26 and the tube 1 to tend to withdraw the piston 34 from telescoped relation with the reduced cylinder portion of the tube to position it for a subsequent lubricant ejecting operation, as later more fully described.

The spring 37 is removed from the path of flow of lubricant through the aperture 7 of the tube being placed rearwardly or outwardly toward the handle of the gun so that lubricant will not encounter the spring and interpose a high resistance to its flow.

The ears 39 form stops engageable with the perforated washer 50 to prevent the piston rod 26 from being withdrawn from the tube 1 more than a predetermined amount corresponding to and predetermining the length of the stroke of the piston 24.

The gun of my invention having its tube 1 and its lubricant reservoir 3 filled with grease and with the parts shown and described in their illustrative operative positions, operates as follows:

If the invention is as illustrated in Fig. 2, the rod 26 is first withdrawn to draw the piston 24 out of the tubular portion 2. If, of the form shown in Fig. 4, the spring 37 normally holds the piston so retracted.

The operator points the slender tube 1 toward the nipple, such as that indicated at 23, assumed to be affixed in lubricant communicating relation to a bearing to be lubricated, and by a forwardly directed movement of his hand clasping the handle by its wire arms 28 and 29, and with the fleshy part of his hand intermediate his thumb and index finger thrust against the rounded surface of the hand grip, the nozzle mouth 22 is telescoped over the end of the nipple to make leak-proof lubricant communicating engagement therewith.

After contact is made lubricant is ejected in quantity substantially equal to that contained in the cylindrical portion 2 of the tube 1, by the act of the operator continuing the forward pressure on the hand grip, thrusting the piston rod 26 with the piston 24 supported on the end thereof, further into the tube 1.

The forwardly moving piston 24 soon engages the lateral walls of the said cylinder portion 2 shutting off communication of lubricant between the enlarged and reduced portions of the tube disposed, respectively, to the rear and forwardly of the piston. The lubricant in the cylinder 2 is then displaced by the forwardly moving piston past the valve ball 42 which is unseated by the increased pressure of lubricant on its approach side, and forced through the intercommunicating bores of the nose 14, nozzle 16 and nipple 23, and into the passages of the mechanism bearing served with lubricant by the nipple.

The operator then withdraws the gun from the nipple and the tube 1 may be thrust forwardly by the spring 37 to separate the piston 24 and cylinder 2 or this operation may be performed by hand, if the construction is that shown in Fig. 2.

By the construction provided the applicant is enabled to sight along that side of the tube 1 opposite to the positions of the handle and lubricant reservoir, in order to carefully place the nozzle into engagement with the nipple, past nearby intervening objects. This sighting may then be accomplished in a similar manner as that involved in sighting a revolver.

The withdrawal of the piston and cylinder from their relatively telescoped lubricant ejecting positions accomplishes a recharging of the bore of the cylinder 2 with lubricant, since preceding any substantial recession of the piston 24 from the cylinder, the valve ball 42 becomes reseated and further spring impelled relative movement of the piston and cylinder reduces the fluid pressure effective within the cylinder to a sub-atmospheric pressure; pressure of atmosphere, therefore, exerted on the outer surface of the lubricant in the reservoir 3, partially through the follower 11, seated on the surface of the lubricant, effects communication of lubricant therefrom through the aligned openings 6 and 7 and the tube 1 towards the cylinder 2, pressing lubricant past the piston 24 into the bore of the cylinder. During the operation of thus recharging the bore of the cylinder, air is prevented from entering the tube 1 around the rod 26 by the air tight seal in the outer end of the tube.

The nozzle 16 will be maintained at all times substantially in axial alignment with the tube 1 by the resilient conduit element 17 in its effort to assume its cylindrical shape. However, in applying the nozzle 16 to the nipple 23, the gun may be rocked laterally in any direction universally about the ball and socket 16' and 15 on the universal joint construction which they provide, and the conduit element 17 will bend correspondingly to maintain a free and open lubricant conduit therethrough to the nozzle 16.

The operator may now successively perform the same operation upon a multiplicity of other nipples disposed variously on the mechanism, for lubricating other bearings thereof and which in an automobile would include the shackle bolt bearings, steering knuckle bearings, and the like, to periodically recharge the cylinder 2 with lubricant after successive discharges of lubricant therefrom until the lubricant in the reservoir 3 is substantially exhausted and the supply of lubricant in the tube 1 is also considerably depleted.

The follower during such periodic operations will ride upon the outer surface of the grease until its movement is stopped because of engagement with the end wall of the reservoir.

Having thus described my invention in the embodiments illustrated, I am aware that numerous and extensive departures may be made from the said embodiments, but without departing from the spirit of my invention.

I claim:

1. In a lubricant gun discharge nozzle, a nose, provided with a spherical socket, a nozzle piece, a spherical knob thereon universally oscillatable in the socket, a conduit through the nose and nozzle piece at all oscillated relative positions, the conduit including a tubular resilient coupling connecting the nose and nozzle piece.

2. In a lubricant gun, a lubricant compression cylinder, a discharge nose therefor provided with a ball and socket joint female portion, a nipple engageable nozzle provided with a ball and socket joint male portion universally oscillatable in the female portion, a lubricant conduit through the nose and nozzle comprising a tubular resilient element connecting the nose and nozzle and a check valve in the conduit.

3. In lubricating means, in combination a lubricant conveying tube, an oscillatory member movably mounted at the end of said tube, said oscillatory member having a longitudinal bore therethrough, common tubular means placed inside said conveying tube and in the bore of said oscillatory member to prevent escape of lubricant between the end of the lubricant conveying tube and the tubular oscillatory member.

4. In lubricating means, in combination a lubricant conveying tube, an oscillatory member movably mounted at the end of said tube, said oscillatory member having a longitudinal bore therethrough, common tubular means placed inside said conveying tube and in the bore of said oscillatory member to prevent escape of lubricant between the end of the lubricant conveying tube and the tubular oscillatory member, and a lubricant receiving nipple having a portion adapted to fit within said bore for the purpose of forming a lubricant tight connection with said oscillatory member.

5. In lubricating means, in combination a lubricant conveying tube, a tubular oscillatory nozzle movably mounted at the end of said tube, and a resilient self-sealing tube connecting the conveying tube and the oscillatory member in a lubricant tight way from any one of angular directions.

6. In a lubricating means, a lubricant conveying tube, a tubular oscillatory nozzle movably mounted at the end of said tube, and self-sealing means placed inside of said tube and nozzle to return said oscillatory nozzle to its normal position.

7. A combination piston rod and hand grip for a lubricant gun comprising a straight rod portion forming a gun piston rod, and a rod portion bent to approximately U-form, joined by an end of one of its arms to an end of said straight portion, its other arm being disposed beyond said straight portion end.

8. A pistol grip handle for lubricating guns comprising a rod bent into substantially U-form, joined to a thrust element of the gun lubricant compressing mechanism, projecting substantially entirely to one side of the gun barrel, one of the arms thereof being disposed more remote from the gun and terminating in a substantially widened manually engageable tongue portion.

9. A combination piston rod and hand grip for a lubricant gun comprising a rod having a straight portion forming a gun piston rod, and an integrally joined portion of approximately U-form, joined by an end of one of its arms to an end of the piston rod, its other arm having a substantially widened portion providing a manually engageable thrust surface, of substantial area.

10. A combination piston rod and hand grip for a lubricant gun comprising a rod having a straight portion forming a gun piston rod, and a portion bent to approximately U-form, joined by an end of one of its arms to an end of said straight portion, and provided with a substantially widened hand thrust portion.

11. A combination piston rod and hand grip for a lubricant gun comprising a straight portion forming a gun piston rod, and a rod portion of approximately U-form, joined by an end of one of its arms to an end of the piston rod, its other arm having a substantially widened portion providing a manually engageable thrust surface of substantial area, said U-form rod portion projecting at a generally obtuse angle from the straight piston rod portion.

12. A hand grip for a lubricant gun comprising a rod bent to approximately U-form, joined by an end of one of its arms to an end of the gun, its other arm provided with a substantially widened hand thrust portion having a curvilinearly outwardly turned tip.

13. A hand grip for a lubricant gun comprising a rod bent to approximately U-form, joined by an end of one of its arms to an end of the gun, its other arm provided with a substantially widened hand thrust portion having a curvilinearly outwardly turned tip, said widened portion provided with a transversely convexly curved outer surface.

14. A combination piston rod and hand grip for a lubricant gun comprising a rod providing a straight portion forming a gun piston rod, and an integrally joined portion of approximately U-form, joined by an end of one of its arms to an end of the piston rod, and provided with a curvilinearly out-turned portion in its arm most remote from the gun, said out-turned portion being disposed approximately in alignment with said straight portion.

15. A combination piston rod and hand grip for a lubricant gun barrel, comprising a wire rod having a piston rod end portion and a handle portion projecting posteriorly from the barrel and extending generally to one side thereof, and providing a hand thrust surface disposed substantially in alignment with the barrel, of substantially increased width relative to the portion of the rod forming the piston rod.

16. A combination piston rod and hand grip for a lubricant gun barrel, comprising a wire rod having a piston rod end portion and a handle portion projecting posteriorly from the barrel and extending generally to one side thereof, and providing a hand thrust surface disposed substantially in alignment with the barrel, of substantially increased width relative to the piston rod portion, said widened thrust surface being transversely convexly curved.

17. A combination piston rod and hand grip for a lubricant gun barrel, comprising a wire rod having a piston rod end portion and a handle portion projecting posteriorly from the barrel and extending generally to one side thereof, and providing a hand thrust surface disposed substantially in alignment with the barrel, of substantially increased width relative to the piston rod portion and terminating in an outwardly turned tip.

18. A hand grip for a lubricant gun comprising a rod bent to approximately U-form, joined by an end of one of its arms to an end of the gun and extending generally to one side thereof, its other arm provided with a substantially widened hand thrust portion provided with a transversely convexly curved outer thrust surface.

19. In a lubricant gun discharge nozzle, a nose, provided with a spherical socket, a nozzle piece, a spherical knob thereon universally oscillatable in the socket, said nose nozzle piece, and knob having alignable longitudinal bores, and a resilient coupling having ends inserted in the nose and knob bores for retracting the knob bore to substantial alignment with the nose bore.

20. In a lubricant gun discharge nozzle, a nose, provided with a spherical socket, a nozzle piece, a spherical knob thereon universally oscillatable in the socket, said nose nozzle piece and knob having alignable longitudinal bores, and a rubber tube having ends inserted in the nose and knob bores for retracting the knob bore to substantial alignment with nose bore.

21. A lubricant gun having a relatively elongated slender dispensing tube, a dispensing nozzle for one end of the tube, compressor means for said tube end, a rod projected through the other tube end reciprocable in the tube to actuate the compressor means, means carried by the tube to supply lubricant thereto through an inlet opening thereof disposed intermediate its ends, and packing means providing an air seal at said other tube end to prevent air being drawn therethrough along the surfaces of said rod, the interior of the tube adjacent said packing means being in free fluid communication with said inlet opening.

22. A lubricant gun having a relatively elongated slender dispensing tube, a dispensing nozzle for one end of the tube, compressor means for said tube end, a rod projected through the other tube end reciprocable in the tube to actuate the compressor means, means carried by the tube to supply lubricant thereto through an inlet opening thereof disposed intermediate its ends, the tube portion intermediate its said other end and said inlet opening, and said lubricant supplying means forming substantially unobstructed branches of a tubular conduit leading to said compressor means, and packing means providing an air seal at said other tube end to prevent air being drawn therethrough along the surfaces of said rod.

In testimony whereof I hereunto affix my signature this 26 day of November, 1929.

OSCAR U. ZERK.